United States Patent
Jeong et al.

(10) Patent No.: US 9,200,116 B2
(45) Date of Patent: Dec. 1, 2015

(54) WATER SOLUBLE BINDER COMPOSITION, METHOD OF PRODUCING THE SAME AND ELECTRODE FOR RECHARGEABLE BATTERY EMPLOYING

(75) Inventors: Hyesun Jeong, Yongin-si (KR); Beomwook Lee, Yongin-si (KR); Hyeran Lee, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 231 days.

(21) Appl. No.: 13/570,397

(22) Filed: Aug. 9, 2012

(65) Prior Publication Data

US 2013/0260223 A1 Oct. 3, 2013

(30) Foreign Application Priority Data

Apr. 3, 2012 (KR) .................. 10-2012-0034598

(51) Int. Cl.

| | |
|---|---|
| *C08G 63/685* | (2006.01) |
| *C08G 63/688* | (2006.01) |
| *C08K 5/06* | (2006.01) |
| *C08K 5/20* | (2006.01) |
| *C08G 73/10* | (2006.01) |
| *C09D 179/08* | (2006.01) |
| *C08J 3/05* | (2006.01) |
| *H01M 4/62* | (2006.01) |
| *H01M 10/052* | (2010.01) |

(52) U.S. Cl.
CPC ........ *C08G 73/1064* (2013.01); *C08G 73/1032* (2013.01); *C08G 73/1046* (2013.01); *C08G 73/1067* (2013.01); *C08G 73/1071* (2013.01); *C08J 3/05* (2013.01); *C09D 179/08* (2013.01); *H01M 4/622* (2013.01); *C08J 2379/08* (2013.01); *H01M 10/052* (2013.01)

(58) Field of Classification Search
CPC .......... C08G 73/1064; C08G 73/1032; C08G 73/1046; C09D 179/08
USPC .......................................................... 524/191
See application file for complete search history.

(56) References Cited

U.S. PATENT DOCUMENTS

| | | | | |
|---|---|---|---|---|
| 4,908,409 | A | * | 3/1990 | Oikawa et al. ................. 528/188 |
| 5,468,571 | A | | 11/1995 | Fujimoto et al. |
| 2008/0131783 | A1 | | 6/2008 | Choi et al. |
| 2009/0107842 | A1 | * | 4/2009 | Park et al. ...................... 204/554 |

FOREIGN PATENT DOCUMENTS

| | | | |
|---|---|---|---|
| JP | 73016331 | * 12/1966 | |
| JP | 06-049360 | * 2/1994 | ............. C08L 79/08 |
| JP | 06-163031 | 6/1994 | |
| JP | 8-227729 | 3/1996 | |
| KR | 10-2008-0047904 A | 5/2008 | |
| KR | 10-2009-0103807 A | 10/2009 | |

OTHER PUBLICATIONS

Machine translation of JP 06-049360. Feb. 1994.*

* cited by examiner

*Primary Examiner* — John Uselding
(74) *Attorney, Agent, or Firm* — Lee & Morse, P.C.

(57) ABSTRACT

A water soluble binder composition for preparing an electrode of a rechargeable battery includes a binder and a conductive agent, the binder including a water soluble polyamic acid having an acid equivalent of about 300 to about 600 g/eq.

21 Claims, No Drawings

WATER SOLUBLE BINDER COMPOSITION, METHOD OF PRODUCING THE SAME AND ELECTRODE FOR RECHARGEABLE BATTERY EMPLOYING

CROSS-REFERENCE TO RELATED APPLICATION

This application claims priority under 35 U.S.C. §119 to Korean Patent Application No. 10-2012-0034598, filed in the Korean Intellectual Property Office on Apr. 3, 2012, the content of which is incorporated herein by reference in its entirety.

BACKGROUND

1. Field

Embodiments relate to a water soluble binder composition, a method of producing the same, and an electrode for a rechargeable battery employing the same. More particularly, embodiments relate to a water soluble binder composition, a method of producing the same, and an electrode for a rechargeable battery employing the same.

2. Description of the Related Art

The development of light-weight, compact, high-performance portable electronic devices has led to a corresponding increase in the demand for a high capacity, long life rechargeable battery.

To satisfy this demand, active research has been conducted into methods for replacing existing active materials for a negative electrode, such as graphite-based material, with materials capable of achieving a high capacity, such as silicon, a silicon and silicon oxide composite, a silicon and graphite composite, tins, or alloys thereof.

SUMMARY

Embodiments are directed to a water soluble binder composition including a binder, the binder including a water soluble polyamic acid having an acid equivalent of about 300 to about 600 g/eq.

The water soluble polyamic acid may be included in the binder composition in an amount of about 5 to 100 wt % based on a total weight of the binder composition.

The water soluble polyamic acid may be a mixture of water soluble polyamic acids having two or more different structures or having two or more different molecular weights.

The binder composition may include one or more solvents selected from N,N-dimethylformamide, N,N-dimethylacetamide, methylethylketone, cyclohexanone, ethyl acetate, butyl acetate, cellosolve acetate, propylene glycol monomethylether acetate, methylcellosolve, butylcellosolve, methylcarbitol, butylcarbitol, propylene glycol monomethylether, diethylene glycol, dimethyl ether, toluene, and xylene.

The binder composition may include a solvent. The solvent may be water.

The water soluble binder composition may further include at least one additive selected from the group of a dispersant, a thickener, a conductive agent, and a filler.

The additive may be contained in an amount of about 0.1 to about 10 wt % based on the weight of the binder composition, excluding a solvent.

Embodiments are also directed to a method of producing a binder composition, the method including preparing an organic solvent soluble polyamic acid by performing condensation polymerization of one or more aromatic diamine monomers and one or more aromatic acid dianhydride monomers in an organic solvent, the prepared organic solvent soluble polyamic acid being dissolved in the organic solvent, and converting the organic solvent soluble polyamic acid into a water soluble polyamic acid, wherein the water soluble polyamic acid has an acid equivalent in a range of about 300 to about 600 g/eq.

The converting of the organic solvent soluble polyamic acid into the water soluble polyamic acid may include converting a carboxylic acid group of the organic solvent soluble polyamic acid into an amine salt or a metal salt.

The converting of the carboxylic acid group into the amine salt or the metal salt may include preparing a polyamic acid powder from the polyamic acid dissolved in the organic solvent, and preparing a polyamic acid dissolved in water by dissolving the polyamic acid powder in a water solution including a water soluble amine compound, a metal hydroxide compound or a metal carbonate compound dissolved therein.

The water solution in which the polyamic powder is dissolved may include the metal hydroxide compound dissolved therein. The metal hydroxide compound may be represented by $M_x(OH)_y$, wherein M is selected from Li, Na, K, Mg, and Ca, $0<x\le1$, and $0<y\le2$.

The water solution in which the polyamic powder is dissolved may include the metal carbonate compound dissolved therein. The metal carbonate compound may be represented by $M_a(CO_3)_b$, wherein M is selected from Li, Na, K, Mg, and Ca, $0<a\le2$, and $0<b\le1$.

The water solution in which the polyamic powder is dissolved may include the water soluble amine compound dissolved therein. The water soluble amine compound may be vaporized in a vacuum drying process to be removed.

The water solution in which the polyamic powder is dissolved may include the water soluble amine compound dissolved therein. The water soluble amine compound may include at least one selected from the group of ammonium hydroxide, methylamine, dimethylamine, trimethylamine, ethylamine, diethylamine, triethylamine, propylamine, dipropylamine, butylamine, pentylamine, hexylamine, cyclohexylamine, monomethanolamine, dimethanolamine, trimethanolamine, monoethanolamine, diethanolamine, triethanolamine, ammonium hydroxide, tetramethylammonium hydroxide, and tetraethylammonium hydroxide.

The converting of the carboxylic acid group into the amine salt or metal salt may include adding an organic solvent soluble amine compound, a metal hydroxide compound or a metal carbonate compound to the polyamic acid dissolved in the organic solvent and stirring such that the polyamic acid is converted into an amine salt or a metal salt, and preparing a water soluble polyamic acid powder with the polyamic acid converted into the amine salt or the metal salt.

The organic solvent soluble amine compound may be added to the polyamic acid dissolved in the organic solvent. The organic solvent soluble amine compound may include at least one selected from the group of ammonium hydroxide, methylamine, dimethylamine, trimethylamine, ethylamine, diethylamine, triethylamine, propylamine, dipropylamine, butylamine, pentylamine, hexylamine, cyclohexylamine, monomethanolamine, dimethanolamine, trimethanolamine, monoethanolamine, diethanolamine, triethanolamine, ammonium hydroxide, tetramethylammonium hydroxide, tetraethylammonium hydroxide, tripentylamine, dibutylamine, dihexylamine, dicyclohexylamine, aniline, and pyridine.

The aromatic diamine monomer may have a molecular weight in a range from about 350 g/mol to about 1000 g/mol, or may have 4 to 10 benzene rings.

The aromatic diamine monomer may include at least one selected from the group of monomers (a) to (j) of Formula 1:

[Formula 1]
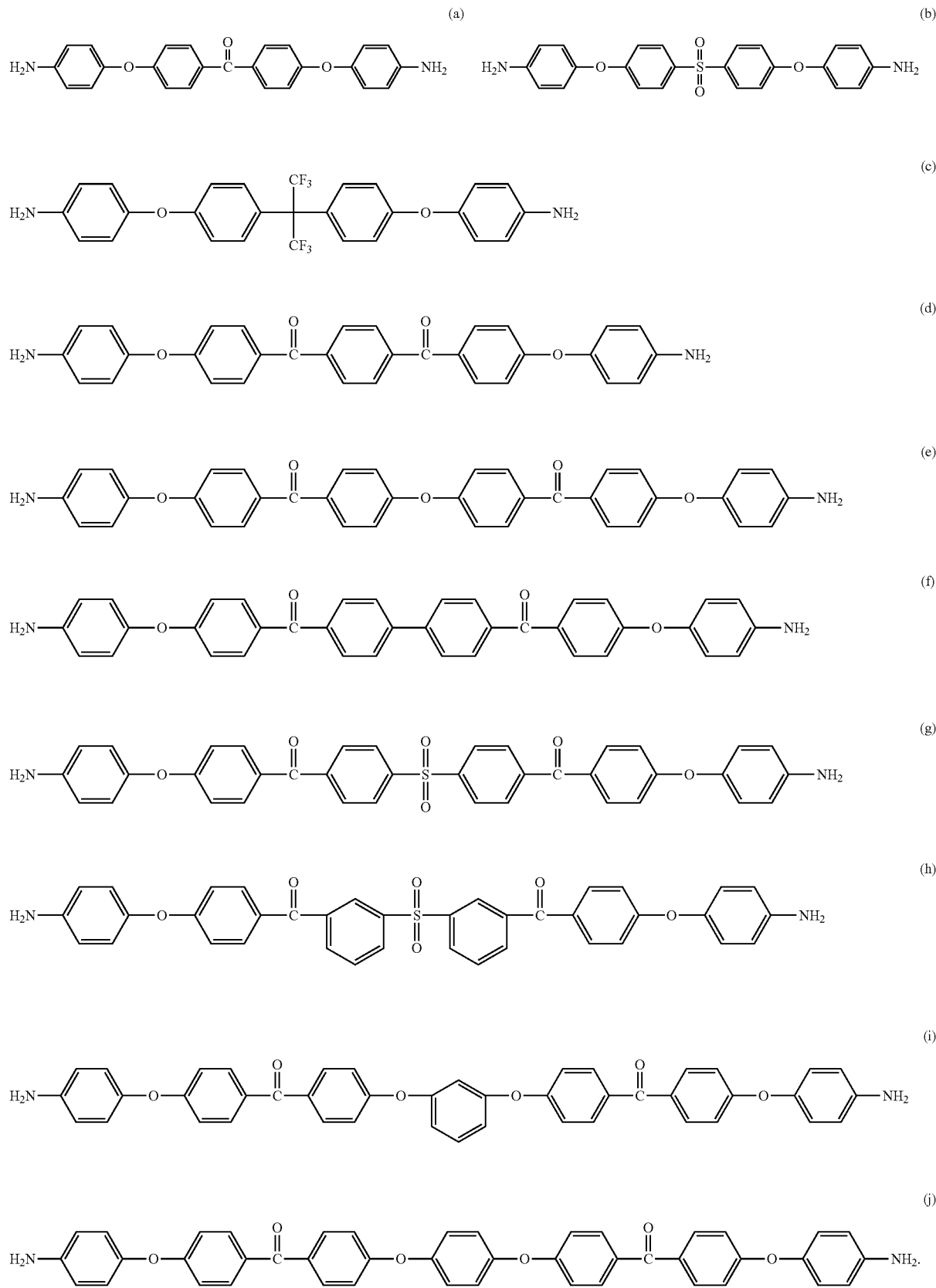

The acid dianhydride monomer may include at least one selected from the group of monomers (a) to (f) of Formula 2:

[Formula 2]

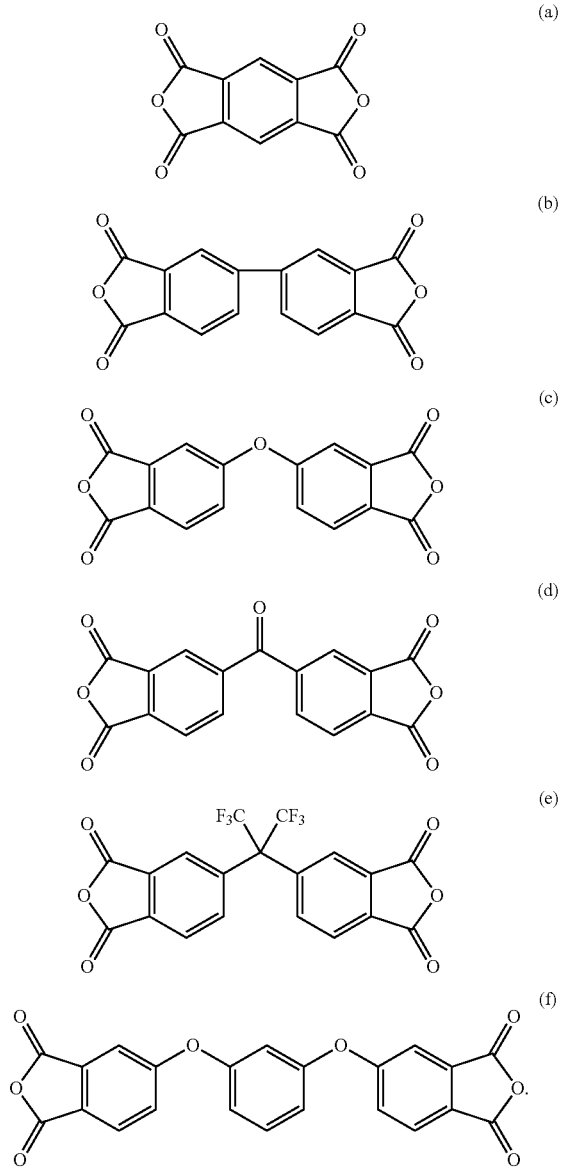

The organic solvent may include at least one selected from the group of meta-cresol, N-methyl-2-pyrrolidone (NMP), dimethylformamide (DMF), dimethylacetamide (DMAc), gamma-butyrolactone, 2-butoxyethanol, and 2-ethoxyethanol.

Embodiments are also directed to a lithium rechargeable battery including a negative electrode, a positive electrode, a separator, and a lithium salt-containing nonaqueous electrolyte, wherein at least one of the negative electrode and the positive electrode includes an electrode current collector; electrode active material, and a binder, and the binder is formed using the water soluble binder composition including a binder that is a water soluble polyamic acid having an acid equivalent of about 300 to about 600 g/eq.

An equivalent of an imide group in the binder may exceed about 300 g/eq.

DETAILED DESCRIPTION

Example embodiments will now be described more fully hereinafter; however, the example embodiments may be embodied in different forms and should not be construed as limited to the embodiments set forth herein. Rather, these embodiments are provided so that this disclosure will be thorough and complete, and will fully convey the scope thereof to those skilled in the art.

The water soluble binder composition according to an embodiment includes a binder that is a water soluble polyamic acid having an acid equivalent of about 300 to about 600 g/eq.

If a water soluble binder composition using polyamic acid that is converted into polyimide during a drying step is used as a binder of a negative electrode, the binder composition may demonstrate excellent adhesion between a current collector and a negative active material, and may have a high tensile strength. Thus, stable adhesion between the current collector and the negative active material may be maintained in spite of a considerable volumetric change of a negative active material during charging and discharging of a rechargeable battery, thereby improving the cycle lifetime characteristics of the rechargeable battery. However, a polyimide may have a disadvantage of poor initial formation efficiency due to reactivity with lithium ions. Moreover, using such a polyimide may not be environmentally friendly because a polyimide typically must be dissolved in an organic solvent to be used. Accordingly, a polyimide may not be directly applied in a water-based process currently used in negative electrode production lines.

The binder composition according to embodiments is water-soluble, so that it can be directly applied in a water-based process. That is, the binder composition according to embodiments may be environmentally friendly. In addition, the acid equivalent of the binder composition according to embodiments may be in a range of about 300 to about 600 g/eq. Therefore, the drying step may produce a relatively small amount of an imide. Accordingly, the problem of reduced initial formation efficiency may be solved, while maintaining excellent adhesion and tensile strength.

<Preparation of a Water Soluble Binder Composition>

1. Preparation of a Water Soluble Polyamic Acid Having an Acid Equivalent in a Range of about 300 to about 600 g/eq The preparation method of the water soluble polyamic acid according to embodiments may include preparing a polyamic acid dissolved in an organic solvent by performing a condensation polymerization of one or more aromatic diamine monomers and one or more aromatic acid dianhydride monomers in the organic solvent, and converting the polyamic acid dissolved in the organic solvent into a water soluble polyamic acid.

Preparation of the Polyamic Acid by Condensation Polymerization

The aromatic diamine monomer may have a molecular weight in a range of from about 350 g/mol to about 1,000 g/mol and/or may have 4 to 10 benzene rings. According to an embodiment, the aromatic diamine monomer may be at least one selected from the group of monomers (a) to (j) of Formula 1:

[Formula 1]
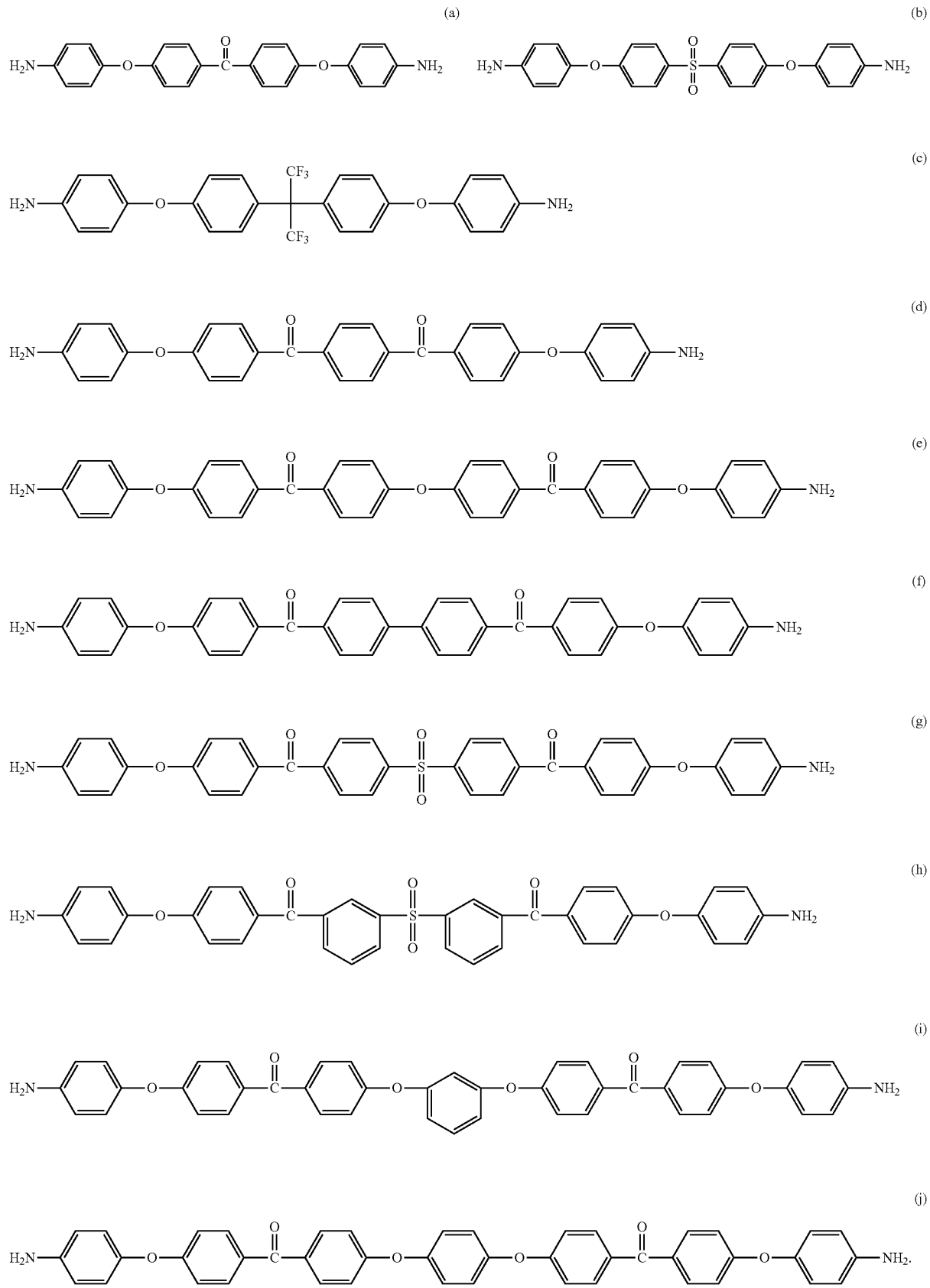

According to the embodiment, the aromatic acid dianhydride monomer may be at least one selected from the group consisting of monomers (a) to (f) of Formula 2:

[Formula 2]

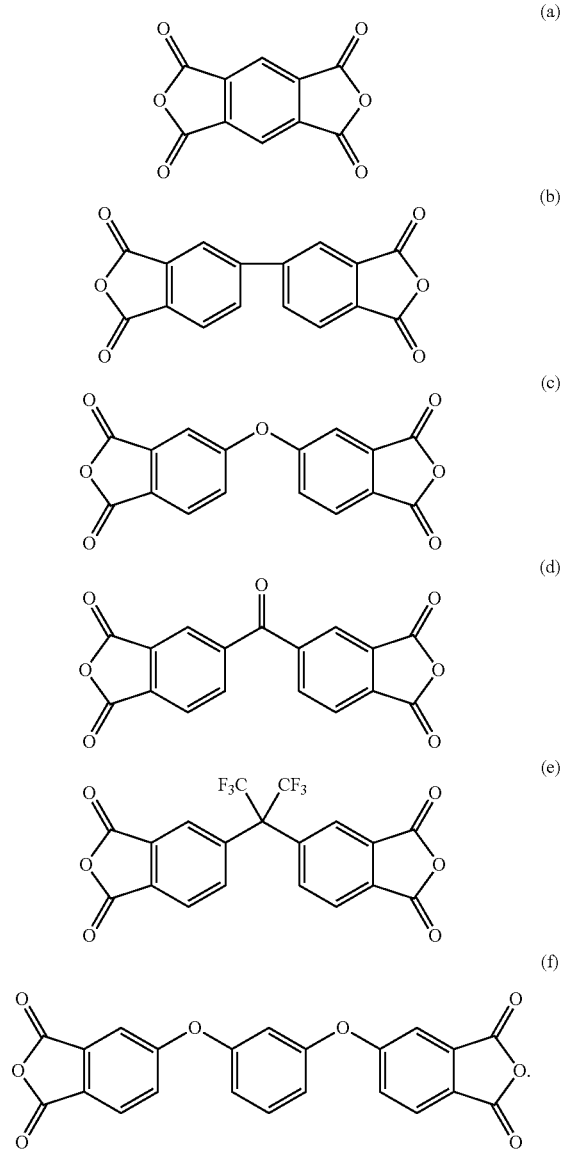

The organic solvent may be at least one selected from the group of meta-cresol, N-methyl-2-pyrrolidone (NMP), dimethylformamide (DMF), dimethylacetamide (DMAc), gamma-butyrolactone, 2-butoxyethanol, and 2-ethoxyethanol.

Converting the Polyamic Acid into a Water Soluble Polyamic Acid

Examples of converting the polyamic acid prepared by condensation polymerization in the organic solvent may include the following methods.

According to one implementation, the organic solvent soluble polyamic acid that is dissolved in an organic solvent may be precipitated in water, petroleum ether, diethylether, a low alcohol, or ethylacetate, and then subjected to filtering, washing, and drying to produce a polyamic acid powder. The polyamic acid powder may be added to water having an appropriate amount of a water soluble amine compound, a metal hydroxide compound, or a metal carbonate compound dissolved therein to convert a carboxyl group in the organic solvent soluble polyamic acid into an amine salt or a metal salt, thereby preparing the water soluble polyamic acid dissolved in water.

This method may be advantageous in that the method may directly result in the preparation of the water soluble polyamic acid. However, a disadvantage of this method may be that the water soluble polyamic acid may be denatured when it is stored in an aqueous state for an extended period of time.

According to another implementation, an appropriate amount of an organic solvent soluble amine compound, a metal hydroxide compound, or a metal carbonate compound may be added to the organic solvent soluble polyamic acid dissolved in the organic solvent. The mixture may be stirred for an appropriate duration of time to convert the carboxyl group in the organic solvent soluble polyamic acid into an amine salt or a metal salt. The stirred solution may be precipitated in petroleum ether, ethyl ether, acetone, a low alcohol, or ethylacetate to then be subjected to filtering, washing, and drying to produce water soluble polyamic acid powder. The thus produced water soluble polyamic acid powder may be dissolved in an appropriate amount of water to then be used.

This method may be advantageous in that the water soluble polyamic acid may be produced in the form of a powder and may be hardly denatured, even when the powder is stored for an extended period of time. However, a disadvantage of this method is that the water soluble polyamic acid powder may need to be dissolved in water before it is used.

Examples of the water soluble amine compound may include at least one of primary to quaternary amines having water solubility. The water soluble amine compound may be a compound that can be volatilized to be removed in the course of converting the water soluble polyamic acid into a polyimide during a vacuum drying step in the manufacture of an electrode.

As examples, the water soluble amine compound may include at least one selected from the group of ammonium hydroxide, methylamine, dimethylamine, trimethylamine, ethylamine, diethylamine, triethylamine, propylamine, dipropylamine, butylamine, pentylamine, hexylamine, cyclohexylamine, monomethanolamine, dimethanolamine, trimethanolamine, monoethanolamine, diethanolamine, triethanolamine, ammonium hydroxide, tetramethylammonium hydroxide, and tetraethylammonium hydroxide.

The term "organic solvent soluble amine compound" may refer to an amine compound dissolved in an organic solvent in preparing the organic solvent soluble polyamic acid. The examples of the organic solvent soluble amine compound may include some of the same compounds as ones that are examples of the water soluble amine compound. In particular, some water soluble amine compounds may also be dissolved in an organic solvent.

In addition to the water soluble amine compounds listed above, examples of the organic solvent soluble amine compound may include at least one amine compound selected from tripentylamine, dibutylamine, dihexylamine, dicyclohexylamine, aniline, and pyridine, which do not dissolve well in water or are insoluble in water.

The amine compound dissolved in only the organic solvent may also be a compound that can be volatilized to be removed in the course of converting the water soluble polyamic acid into a polyimide during a vacuum drying step in the manufacture of an electrode.

The metal hydroxide compound may be a compound represented by $M_x(OH)_y$, where M is selected from Li, Na, K, Mg, and Ca, $0<x\le1$, and $0<y\le2$. Examples of the metal hydroxide compound may include at least one selected from the group of lithium hydroxide, sodium hydroxide, potassium hydroxide, magnesium hydroxide, and calcium hydroxide.

The metal carbonate compound may be a compound represented by $M_a(CO_3)_b$, where M is selected from Li, Na, K, Mg, and Ca, $0<a\le2$, and $0<b\le1$. Examples of the metal carbonate compound may include at least one selected from the group of lithium carbonate, sodium carbonate, potassium carbonate, magnesium carbonate, and calcium carbonate.

In an implementation, only one type of water soluble polyamic acid may be used in the binder composition. In other implementations, in order to improve various characteristics, including adhesion between an active material and a current collector, slurry dispersibility, and so on, two or more types of water soluble polyamic acids having different structures may be used in combination in the binder composition. In other implementations, polyamic acids having the same structure but different molecular weights may be used in combination in the binder composition.

According to an embodiment, the water soluble polyamic acid may be preferably contained in an amount of about 5 to 100 wt %, more preferably in an amount of about 10 to about 90 wt %, based on a total weight of the binder composition. If the amount of the water soluble polyamic acid is more than about 5 wt %, desired characteristics may be attained.

2. Other Additives

In order to improve additional characteristics, the binder composition may include additional additives, as well as the water soluble polyamic acid.

Examples of the additives include a dispersant, a thickener, a conductive agent, and a filler.

The respective additives may be mixed with the binder composition in advance to then be used. In other implementations, the respective additives may be separately prepared and then independently used.

Components of the additives to be used may be determined according to the active material and binder used. In some cases, the additives may be omitted.

The amount of each of the additives may vary according to the kind of active material, components of the binder, and the kind of additive. The additives may be contained in an amount of about 0.1 to about 10 wt % relative to the weight of the binder composition, excluding the solvent. If the amount of the additive is about 0.1 wt % or greater, the addition effect of the additive may be provided. If the amount of the additive is about 10 wt % or less, the proportion of the binder based on the amount of the binder composition for forming a negative electrode may be maintained, so that desired characteristics may be attained.

The dispersant may be selected from a material capable of improving the dispersibility of a positive or negative active material and a conductive agent in the slurry. The dispersant may be selected from cationic, anionic, and nonionic dispersants. Examples of the dispersant include at least one selected from the group of hydrocarbons having 5-20 carbon atoms in a lipophilic portion, an acryl oligomer, an ethylene oxide oligomer, a propylene oxide oligomer, an ethylene oxide and propylene oxide oligomer, and a urethane oligomer.

The thickener may facilitate the coating of the slurry on a current collector when the slurry has a low viscosity. Examples of the thickener include at least one selected from the group of carboxymethyl cellulose, carboxyethyl cellulose, ethyl cellulose, hydroxymethyl cellulose, hydroxyethyl cellulose, hydroxypropyl cellulose, and polyvinylalcohol.

However, the dispersant and the thickener may be mostly pyrolyzed at a vacuum drying temperature in a range of 250° C. to 450° C. to be removed. Thus, the dispersant and the thickener are preferably used in small amounts only when necessary.

The conductive agent may be a component for improving a conductive path of an electrode. The conductive agent may be used to impart conductivity to the binder composition. Any electronically conductive material that does not cause a chemical change to the battery may be used as the conductive agent. Examples thereof include at least one conductive material selected from the group of natural graphite, artificial graphite, carbon nanofiber, carbon black, acetylene black, ketjen black, copper, nickel, aluminum, and silver metal powder.

The filler may be an auxiliary component for suppressing electrode expansion by improving the strength of the binder. Examples thereof include at least one fibrous material selected from the group of glass fiber, carbon fiber, and metal fiber.

3. Solvent

Water is most preferred as the solvent of the binder composition. In some cases, at least one solvent may be selected from the group of N,N-dimethylformamide, N,N-dimethylacetamide, methylethylketone, cyclohexanone, ethyl acetate, butyl acetate, cellosolve acetate, propylene glycol monomethylether acetate, methylcellosolve, butylcellosolve, methylcarbitol, butylcarbitol, propyleneglycol monomethylether, diethyleneglycol dimethylether, toluene, and xylene.

The content of the solvent is not particularly restricted as long as the solvent can appropriately adjust the viscosity of slurry.

<Preparation of Electrode Active Material Slurry>

An electrode active material slurry may be prepared by mixing the binder composition with electrode active materials.

When the electrode is a negative electrode, crystalline carbon, amorphous carbon, or a combination thereof, may be used as the active material. Examples of the crystalline carbon include amorphous, plate-type, flake-type, globular, or fibrous natural or artificial graphite. Examples of the amorphous carbon include soft carbon (carbon sintered at low temperature), hard carbon (carbon sintered at high temperature), mesophase pitch carbide, or sintered cokes. The negative active material may be selected from the group of Si, $SiO_x$ ($0<x<2$), Sn, $SnO_2$, Si-containing metal alloys, and mixtures thereof. Examples of the metal capable of forming the Si alloys may include at least one selected from the group of Al, Sn, Ag, Fe, Bi, Mg, Zn, In, Ge, Pb, and Ti.

When the electrode is a positive electrode, a lithiated intercalation compound capable of reversibly intercalating and deintercalating lithium may be used as the active material.

Specific examples of the lithiated intercalation compound include lithium cobalt oxide ($LiCoO_2$); lithium nickel oxide ($LiNiO_2$); lithium manganese oxides, such as compounds of the formula $Li_{1+x}Mn_{2-x}O_4$ ($0\le x\le0.33$), $LiMnO_3$, $LiMn_2O_3$, and $LiMnO_2$; lithium copper oxide ($Li_2CuO_2$); lithium iron oxide ($LiFe_3O_4$); lithium vanadium oxide ($LiV_3O_8$); copper vanadium oxide ($Cu_2V_2O_7$); vanadium oxides such as $V_2O_5$; Ni-site type lithiated nickel oxides of the formula $LiNi_{1-x}M_x$ ($O_2$ (M=Co, Mn, Al, Cu, Fe, Mg, B, or Ga, and $0.01\le x\le0.3$); lithium manganese composite oxides of the formula $LiMn_{2-x}M_xO_2$ (M=Co, Ni, Fe, Cr, Zn, or Ta, and $0.01\le x\le0.1$), or the formula $Li_2Mn_3MO_8$ (M=Fe, Co, Ni, Cu, or Zn); $LiMn_2O_4$ wherein a portion of Li is substituted with alkaline earth metal ions; disulfide compounds; or iron molybdenum oxide ($Fe_2(MoO_4)_3$), etc.

The binder composition or other general binders may be used as the binder for a positive electrode. General binders may serve to efficiently adhere positive active material particles to one another or to efficiently adhere positive active material to a current collector. Examples of general binders include polymers including polyvinyl alcohol, carboxymethylcellulose, hydroxypropylcellulose, diacetylcellulose, polyvinylchloride, carboxylated polyvinylchloride, polyvinylfluoride, and ethylene oxide; polyvinyl pyrrolidone, polyurethane, polytetrafluoroethylene, polyvinylidene fluoride, polyethylene, polypropylene, styrene butadiene rubber, acrylated styrene butadiene rubber, epoxy resin, or nylon.

<Manufacture of Electrode>

The slurry prepared using the binder composition for forming an electrode and an electrode active material may be coated onto a current collector, heated, and dried under vacuum to form an electrode active material layer.

The coating of the slurry may be performed by one selected from the group of screen printing, spray coating, coating using a doctor blade, gravure coating, deep coating, silk screening, painting, and coating using a slot die, according to the viscosity of slurry.

The current collector may be fabricated to have a thickness of about 3 to about 100 μm. Any current collector having suitable conductivity without causing chemical changes in the fabricated battery may be used. Examples of the current collector include copper, stainless steel, aluminum, nickel, titanium, sintered carbon, copper or stainless steel having a surface treated with carbon, nickel, titanium or silver, or aluminum-cadmium alloys.

In addition, the current collector may be processed to form fine irregularities on the surface thereof so as to enhance the adhesive strength with respect to the electrode active material. In addition, the current collector may be used in various forms including films, sheets, foils, nets, porous structures, foams, or non-woven fabrics.

The slurry may be coated on the current collector to then be subjected to drying. In the drying of a composition for forming a negative active material layer, a first heat treatment may be performed at a temperature of 80 to 120° C. to evaporate the solvent (water or organic solvent).

If the temperature of the first heat treatment is higher than 80° C., the solvent, for example, water, may be removed from the electrode. If the temperature of the first heat treatment is lower than 120° C., rapid evaporation of the solvent (for example, water), which may generate bubbles on a surface of the electrode and reduce uniformity of the electrode surface, may be avoided.

The drying may be performed in an atmospheric environment.

After the solvent in the composition coated on the current collector by the first heat treatment is completely evaporated, second heat treatment may be performed under a vacuum.

The second heat treatment may be performed at a temperature of 250 to 450° C. under a vacuum of $1\times10^{-4}$ to $1\times10^{-6}$ torr to convert the polyamic acid into a polyimide.

In the second heat treatment, a conversion ratio of the polyamic acid into a polyimide may depend on the kind of binder used and the temperature of heat treatment.

<Manufacture of Rechargeable Battery>

A rechargeable battery may include the negative and positive electrode, a separator, and a lithium salt containing a nonaqueous electrolyte.

The separator may be interposed between the positive electrode and the negative electrode. As the separator, an insulating thin film having a high ion permeability and high mechanical strength may be used. The separator typically may have a pore diameter of about 0.01 to about 10 μm and a thickness of about 5 to about 100 μm. As the separator, sheets or non-woven fabrics made of an olefin polymer such as polypropylene and/or a glass fiber, or polyethylene, which have chemical resistance and hydrophobicity, may be used. When a solid electrolyte such as a polymer is employed as the electrolyte, the solid electrolyte may also serve as both the separator and electrolyte.

Specific examples of the olefin polymer used as the separator include polyethylene, polypropylene, polytetrafluoroethylene (PTFE), a multi-layered structure having two or more layers of these materials, a composite multi-layered structure such as a polyethylene/polypropylene two layered separator, a polyethylene/polypropylene/polyethylene three layered separator, or a polypropylene/polyethylene/polypropylene three layered separator.

The lithium salt-containing non-aqueous electrolyte may include a non-aqueous electrolyte and a lithium salt. As the non-aqueous electrolyte, a non-aqueous organic solvent, an organic solid electrolyte or an inorganic solid electrolyte may be used.

Examples of the nonaqueous electrolyte include aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides, and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt may be a material that is readily soluble in the above-mentioned non-aqueous electrolyte. Examples thereof include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, a lower aliphatic carboxylic acid lithium, lithium tetraphenyl borate, or imide. Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like, may be added to the non-aqueous electrolyte. If desired, in order to impart incombustibility, the non-aqueous electrolyte may further include halogen-containing solvents such as carbon tetrachloride or ethylene trifluoride. Further, in order to improve high-temperature storage characteristics, the non-aqueous electrolyte may additionally include carbon dioxide gas.

<Synthesis of Aromatic Diamine Monomer>

Preparation Example 1

10.91 g (0.05 mol) of 4,4'-difluorobenzophenone was added to a reaction vessel under a nitrogen stream to be dissolved in 30 ml of NMP. 11.46 g (0.1 mol) of p-aminophenol was added thereto and stirred to give a homogenized solution. To the homogenized solution, 7.6 g of potassium carbonate ($K_2CO_3$) was added and stirred to raise the temperature of the reaction vessel up to 120° C., followed by reacting for 6 hours. The reactant was slowly poured into a container including 500 ml of water while stirring to give a sticky precipitate. Then, water was removed from the reactant, followed by recrystallizing the precipitate using ethanol, thereby preparing aromatic diamine monomer I represented by formula 1(a).

Preparation Example 2

① Preparation of 4,4'-di(4-fluorobenzoyl)diphenyl ether 8.51 g (0.05 mol) of diphenyl ether and 15.86 g (0.1 mol) of 4-fluorobenzoyl chloride were added to a reaction vessel under a nitrogen stream to be dissolved in 25 ml of methylene chloride. To the reaction vessel maintained at a temperature of 0° C. using water/ice bath, a slurry prepared by dissolving 16.0 g (0.12 mol) of aluminum chloride in 50 ml of methylene chloride was slowly added while stirring. After the adding was completed, the water/ice bath was removed to maintain the temperature of the reaction vessel at room temperature, followed by stirring for 18 hours, thereby preparing a reactant. The reactant was slowly poured to into a container including 500 ml of a 0.1M HCl solution while stirring to give a sticky precipitate. Thereafter, methylene chloride was removed from the reactant, followed by washing using a 0.5M $NaHCO_3$ solution and drying in a vacuum drying oven at 90° C. for 12 hours. The dried product was recrystallized using toluene, thereby preparing 4,4'-di(4-fluorobenzoyl)diphenylether represented by formula 3:

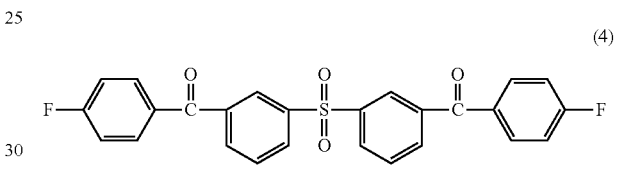

(3)

② Synthesis of Aromatic Diamine Monomer II

The aromatic diamine monomer II represented by Formula 1(e) was synthesized by the same method as in Preparation Example 1, except that 20.72 g (0.05 mol) of 4,4'-di(4-fluorobenzoyl)diphenyl ether represented by Formula 3 was used, instead of 4,4'-difluorobenzophenone.

Preparation Example 3

① Preparation of 3,3'-di(4-fluorobenzoyl)diphenyl sulfone 10.91 g (0.05 mol) of diphenyl sulfone and 15.86 g (0.1 mol) of 4-fluorobenzoyl chloride were added to a reaction vessel under a nitrogen stream to be dissolved in 25 ml of NMP. A slurry of 16.0 g (0.12 mol) of aluminum chloride was slowly added to 50 ml of NMP at room temperature while stirring.

After the adding was completed, the temperature of the reaction vessel was raised to 120° C., followed by stirring for 12 hours, thereby preparing a reactant. The reactant was slowly poured into a container including 500 ml of a 0.1M HCl solution while stirring to give a sticky precipitate. Then, methylene chloride was removed from the reactant, followed by washing using a 0.5M $NaHCO_3$ solution and drying in a vacuum drying oven at 90° C. for 12 hours. The dried product was recrystallized using toluene, thereby preparing 3,3'-di(4-fluorobenzoyl)diphenyl sulfone represented by Formula 4:

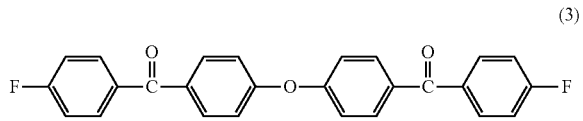 [SMILES: O=C(c1ccc(F)cc1)c1ccc(Oc2ccc(C(=O)c3ccc(F)cc3)cc2)cc1]

(4)

② Synthesis of Aromatic Diamine Monomer III

The aromatic diamine monomer III represented by Formula 1(h) was synthesized by the same method as in Preparation Example 1, except that 23.12 g (0.05 mol) of 3,3'-di(4-fluorobenzoyl)diphenyl sulfone represented by Formula 4 was used, instead of 4,4'-difluorobenzophenone.

<Preparation of Organic Solvent Soluble Polyamic Acid>

Example 1-1

7.76 g (0.025 mol) of oxydiphthalic anhydride (ODPA) and 70.68 g of NMP were added to a reaction vessel and stirred at room temperature under a nitrogen stream to be completely dissolved, followed by adding 9.91 g (0.025 mol) of the diamine monomer I prepared in Preparation Example 1 thereto, and then stirring at room temperature for 12 hours, thereby preparing a solution of the polyamic acid I represented by Formula 5 having 20% solids dissolved in NMP. The acid equivalent of the prepared polyamic acid I was 354 g/eq, and the weight average molecular weight thereof was 153,000 g/mol, as analyzed by gel permeation chromatography (GPC).

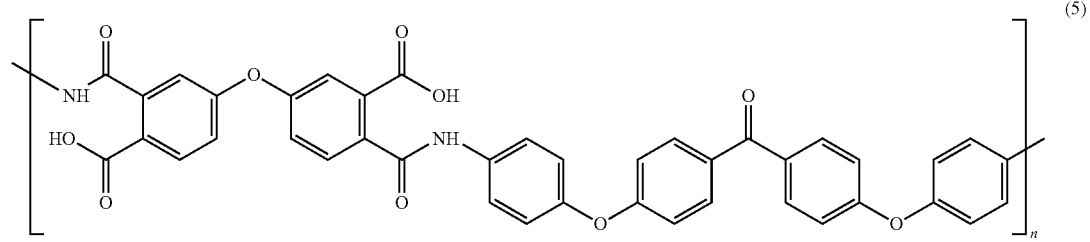

(5)

Example 1-2

7.76 g (0.025 mol) of oxydiphthalic anhydride (ODPA) and 90.32 g of NMP were added to a reaction vessel and stirred at room temperature under a nitrogen stream to be completely dissolved, followed by adding 14.82 g (0.025 mol) of the diamine monomer II prepared in Preparation Example 2 thereto, and then stirring at room temperature for 12 hours, thereby preparing a solution of polyamic acid I represented by Formula 6 having 20% solids dissolved in NMP. The acid equivalent of the prepared polyamic acid II was 452 g/eq, and the weight average molecular weight thereof was 121,000 g/mol, as analyzed by gel permeation chromatography (GPC) analysis.

(6)

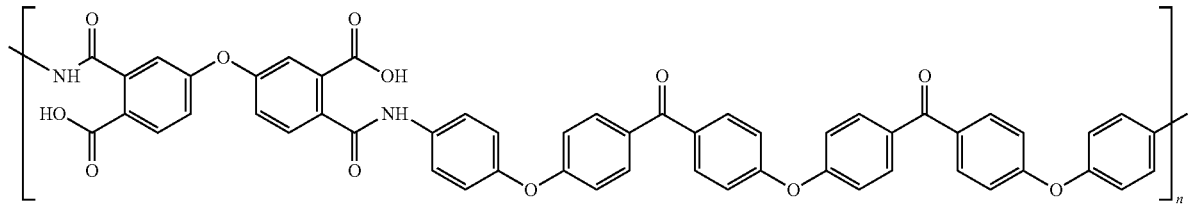

Example 1-3

7.76 g (0.025 mol) of oxydiphthalic anhydride (ODPA) and 95.12 g of NMP were added to a reaction vessel and stirred at room temperature under a nitrogen stream to be completely dissolved, followed by adding 16.02 g (0.025 mol) of the diamine monomer III prepared in Preparation Example 3 thereto, and then stirring at room temperature for 12 hours, thereby preparing a solution of polyamic acid I represented by Formula 7 having 20% solids dissolved in NMP. The acid equivalent of the prepared polyamic acid III was 476 g/eq, and the weight average molecular weight thereof was 116,000 g/mol, as analyzed by gel permeation chromatography (GPC) analysis.

(7)

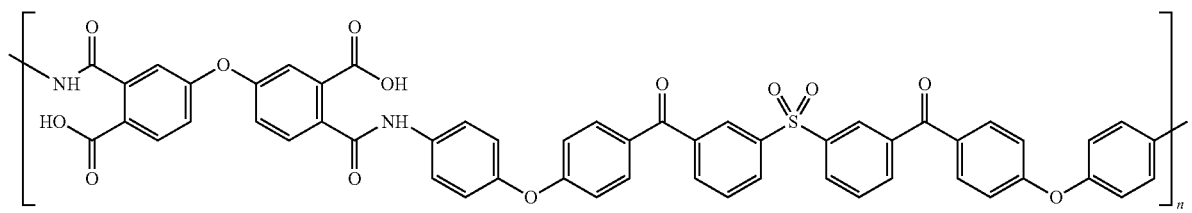

Comparative Example 1-1

7.76 g (0.025 mol) of oxydiphthalic anhydride (ODPA) and 51.08 g of NMP were added to a reaction vessel and stirred at room temperature under a nitrogen stream to be completely dissolved, followed by adding 5.01 g (0.025 mol) of 4,4'-oxydianiline (ODA) thereto and then stirring at room temperature for 12 hours, thereby preparing a solution of the polyamic acid 1 represented by Formula 8 having 20% solids dissolved in NMP. The acid equivalent of the prepared polyamic acid 1 was 256 g/eq, and the weight average molecular weight thereof was 155,000 g/mol, as analyzed by gel permeation chromatography (GPC).

(8)

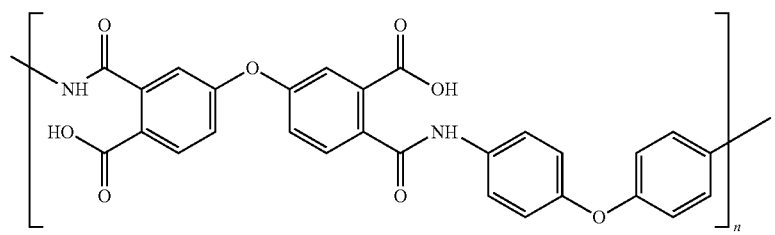

Comparative Example 1-2

7.76 g (0.025 mol) of oxydiphthalic anhydride (ODPA) and 41.84 g of NMP were added to a reaction vessel and stirred at room temperature under a nitrogen stream to be completely dissolved, followed by adding 2.70 g (0.025 mol) of p-phenylenediamine (p-PDA) thereto and then stirring at room temperature for 12 hours, thereby preparing a solution of the polyamic acid 2 represented by Formula 9 having 20% solids dissolved in NMP. The acid equivalent of the prepared polyamic acid 2 was 210 g/eq, and the weight average molecular weight thereof was 137,000 g/mol, as analyzed by gel permeation chromatography (GPC).

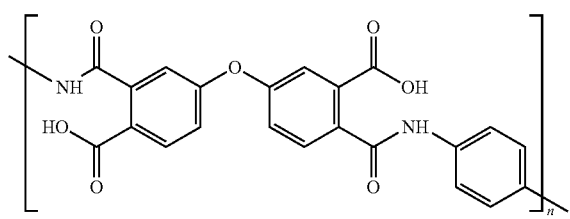

(9)

<Preparation of Water Soluble Polyamic Acid>

Example 2-1

50 g of a solution of the polyamic acid I prepared in Example 1-1 dissolved in NMP, was added to a reaction vessel with a stirrer, and 40 ml of a 1M $NH_4OH$ solution was slowly added thereto while stirring. Thereafter, the reactant was stirred at room temperature for 6 hours, followed by slowly pouring into a container including 1 L of acetone while stirring, to prepare a precipitate. Then, the precipitate was subjected to filtering, washing, and drying in a vacuum oven maintained at 60° C. for 3 hours to obtain a powder. 5 g of the obtained powder was dissolved in 95 g of pure water, thereby preparing an aqueous solution of polyamic acid I with 5% solids.

Examples 2-2 and 2-3

Aqueous solutions of polyamic acids II and III with 5% solids were respectively prepared by the same method as in Example 2-1, except that polyamic acid solutions II and III prepared in Examples 1-2 and 1-3 were used, instead of the polyamic acid I prepared in Example 2-1.

Comparative Examples 2-1 and 2-2

Aqueous solutions of polyamic acid 1 and 2 with 5% solids were prepared by the same method as in Example 2-1, except that polyamic acid solutions 1 and 2 prepared in Comparative Examples 1-1 and 1-2 were used, instead of the polyamic acid I prepared in Example 2-1.

<Preparation of Electrode Active Material Slurry>

Example 3-1

A negative electrode slurry composition I was prepared in a slurry preparation container using a mixture including 40 g of the aqueous solution of polyamic acid I with 5% solids prepared in Example 2-1, 12 g of Si-alloy, 5 g of graphite as a negative active material and 1 g of ketjen black as a conductive agent.

Examples 3-2 and 3-3

Electrode active material slurry compositions II and III were prepared by the same method as in Example 3-1, except that the polyamic acids II and III prepared in Examples 2-2 and 2-3 were used, instead of the aqueous solution of polyamic acid I.

Comparative Examples 3-1 and 3-2

Electrode active material slurry compositions 1 and 2 were prepared by the same method as in Example 3-1, except that the polyamic acids 1 and 2 prepared in Comparative Examples 2-1 and 2-2 were used, instead of the aqueous solution of polyamic acid I.

<Manufacture of Electrodes and Batteries>

Each of the negative electrode slurry compositions prepared in Examples 3-1 to 3-3 and Comparative Examples 3-1 and 3-2 was coated on a copper foil, primarily dried at 110° C. for 0.5 hours, subjected to punching, pressing, and welding for manufacturing a coin cell, and vacuum dried in a vacuum oven at a temperature of 350° C. for 2 hours, thereby manufacturing a negative electrode.

The thus manufactured negative electrode for a rechargeable battery, Li metal as a counter electrode, and a porous polypropylene film as a separator were used to manufacture a half cell for a lithium rechargeable battery. Here, a mixed solution of ethylene carbonate and diethylene carbonate (1:1 by volume) having 1M $LiPF_6$ dissolved therein was used as an electrolyte. Cell assembly was performed in a glove box filled with argon gas, and then battery characteristics were evaluation using a charge/discharge device for 100 mA.

<Evaluation of Battery Characteristics>

In order to evaluate initial formation efficiency, the manufactured cells for battery testing were charged and discharged at room temperature (25° C.) at 0.2 C. In order to evaluate discharge retention, the test cells were charged at 0.5 C and discharged at 1.0 C. The test cells were fully charged at a constant current with a cutoff voltage of 0.01 V, and were discharged with a constant current to reach a voltage of 1.4 V. 50 cycles of charge and discharge operations were performed to evaluate charge/discharge cycle characteristics. In order to evaluate battery characteristics more accurately, each 4 test cells with the same conditions were evaluated at the same time. The results are shown in Table 1, in which average values for performance items of 4 cells are listed.

TABLE 1

| Slurry | Initial formation efficiency (%) | Initial discharge capacity (mAh/cc) | Discharge capacity @ 50 cycles (mAh/cc) | Discharge capacity retention @ 50 cycles (%) |
|---|---|---|---|---|
| Example 3-1 | 91 | 1167 | 957 | 82% |
| Example 3-2 | 92 | 1178 | 954 | 81% |
| Example 3-3 | 92 | 1185 | 948 | 80% |
| Comparative Example 3-1 | 87 | 1118 | 894 | 80% |
| Comparative Example 3-2 | 85 | 1088 | 860 | 79% |

As shown in Table 1, the electrodes manufactured using the negative electrode slurry compositions I to III prepared in Examples 3-1 to 3-3 were superior to the electrodes manufactured using the negative electrode slurry compositions 1 and 2 prepared in Comparative Examples 3-1 and 3-2 in view of the initial formation efficiency. However, there were no significant differences in view of cycle lifetime characteristics between the electrodes manufactured using the negative electrode slurry compositions I to III prepared in Examples 3-1 to 3-3 and the electrodes manufactured using the negative electrode slurry compositions 1 and 2 prepared in Comparative Examples 3-1 and 3-2. This is presumably due to the imide content in the binder. That is to say, the electrodes manufactured using the negative electrode slurry compositions I to III prepared in Examples 3-1 to 3-3 have a relatively low content of imide groups in the binder. Accordingly, it may be suggested that the negative electrode slurry compositions I to III have a high initial formation efficiency due to the small amount of lithium ions consumed because the low content of imide groups to react with lithium ions, compared to the electrodes manufactured using the negative electrode slurry compositions 1 and 2 prepared in Comparative Examples 3-1 and 3-2. However, the cycle lifetime characteristic of battery is not correlated with the imide content. Accordingly, there were no significant differences between the electrodes of Examples 3-1 to 3-3 and the electrodes of Comparative Examples 3-1 and 3-2 in cycle lifetime characteristics.

By way of summation and review, active materials such as silicon, a silicon and silicon oxide composite, a silicon and graphite composite, tins, or alloys thereof that are capable of achieving a high capacity in a negative electrode of a secondary battery may undergo a considerable volumetric change during charging and discharging of the rechargeable battery, compared to graphite-based active material. In the development of materials for solving the problems that arise when such high-capacity negative active materials are used, there has been proposed a process of preparing a binder using a polyamic acid composition that is converted into a polyimide during a drying step. However, a polyimide has a disadvantage of poor initial formation efficiency due to reactivity of the polyimide with lithium ions. In addition, since polyimides should be dissolved in an organic solvent to be usable, polyimides are not environmentally friendly and cannot be directly applied to water-based processes currently employed in negative electrode production lines.

Embodiments described herein may provide a water soluble binder composition that may solve problems that may arise with a polyimide binder, including reduced initial formation efficiency and an environmentally unfriendly property, while retaining advantages of the polyimide binder. Embodiments further provide an electrode for a rechargeable battery and a rechargeable battery employing the same, which are environmentally friendly and have a high initial formation efficiency.

An electrode for a rechargeable battery may be produced using the water soluble binder composition according to the embodiments, which may reduce initial formation efficiency due to a relatively small amount of imide in the electrode, may provide an environmentally friendly property due to water solubility of the binder, and may be directly employed in currently-existing water-based negative electrode production lines without changing the water-based process.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:
1. A water soluble binder composition for preparing an electrode of a rechargeable battery, comprising a binder and a conductive agent, the binder including a water soluble polyamic acid having an acid equivalent of about 300 to about 600 g/eq, wherein the water soluble polyamic acid includes an aromatic moiety derived from at least one selected from the following aromatic diamine monomers (d) to (j):

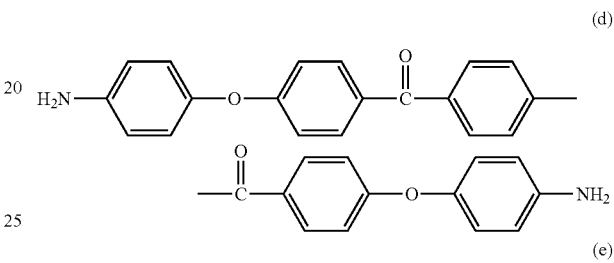

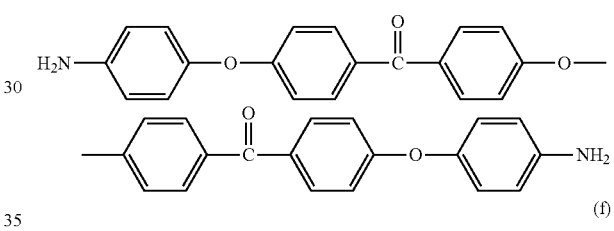

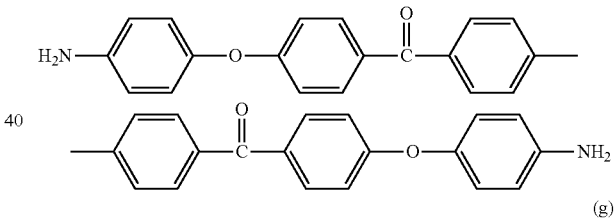

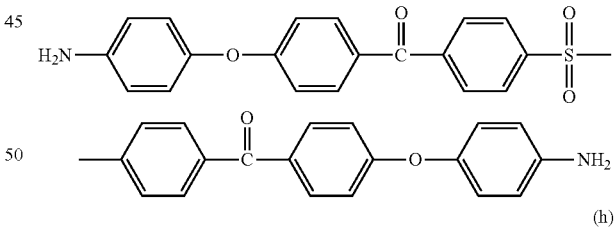

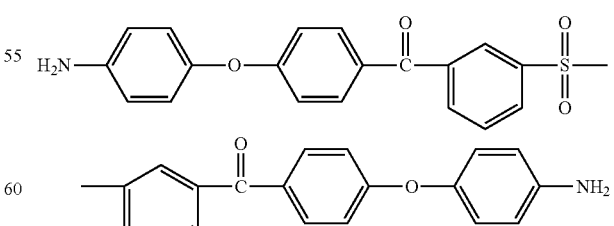

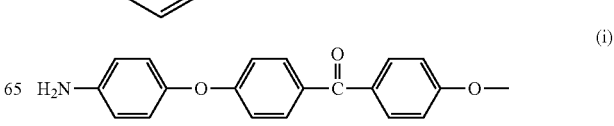

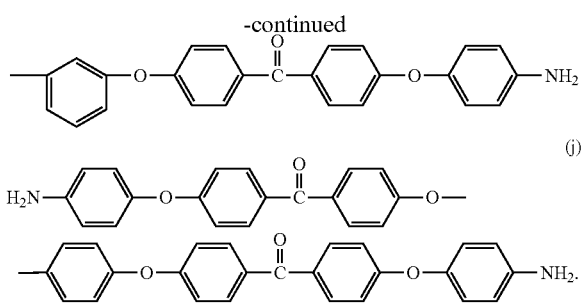

(j)

2. The water soluble binder composition as claimed in claim 1, wherein the water soluble polyamic acid is included in the binder composition in an amount of about 5 to about 99.9 wt % based on a total weight of the binder composition.

3. The water soluble binder composition as claimed in claim 1, wherein the water soluble polyamic acid is a mixture of water soluble polyamic acids having two or more different structures or having two or more different molecular weights.

4. The water soluble binder composition as claimed in claim 1, wherein the binder composition includes one or more solvents selected from N,N-dimethylformamide, N,N-dimethylacetamide, methylethylketone, cyclohexanone, ethyl acetate, butyl acetate, cellosolve acetate, propylene glycol monomethylether acetate, methylcellosolve, butylcellosolve, methylcarbitol, butylcarbitol, propylene glycol monomethylether, diethylene glycol, dimethyl ether, toluene, and xylene.

5. The water soluble binder composition as claimed in claim 1, wherein:
the binder composition includes a solvent, and
the solvent is water.

6. The water soluble binder composition as claimed in claim 1, further comprising at least one additive selected from the group of a dispersant, a thickener, and a filler.

7. The water soluble binder composition as claimed in claim 2, wherein the conductive agent is contained in an amount of about 0.1 to about 10 wt % based on the weight of the binder composition, exclusive of solvent.

8. A method of producing a water soluble binder composition for preparing an electrode of a rechargeable battery, the method comprising:
preparing an organic solvent soluble polyamic acid by performing condensation polymerization of one or more aromatic diamine monomers and one or more aromatic acid dianhydride monomers in an organic solvent, the prepared organic solvent soluble polyamic acid being dissolved in the organic solvent;
converting the organic solvent soluble polyamic acid into a water soluble polyamic acid, wherein the water soluble polyamic acid has an acid equivalent in a range of about 300 to about 600 g/eq; and
mixing the water soluble polyamic acid with a conductive agent, wherein the aromatic diamine monomer includes at least one selected from the following aromatic diamine monomers (d) to (j):

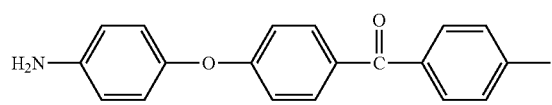

(d)

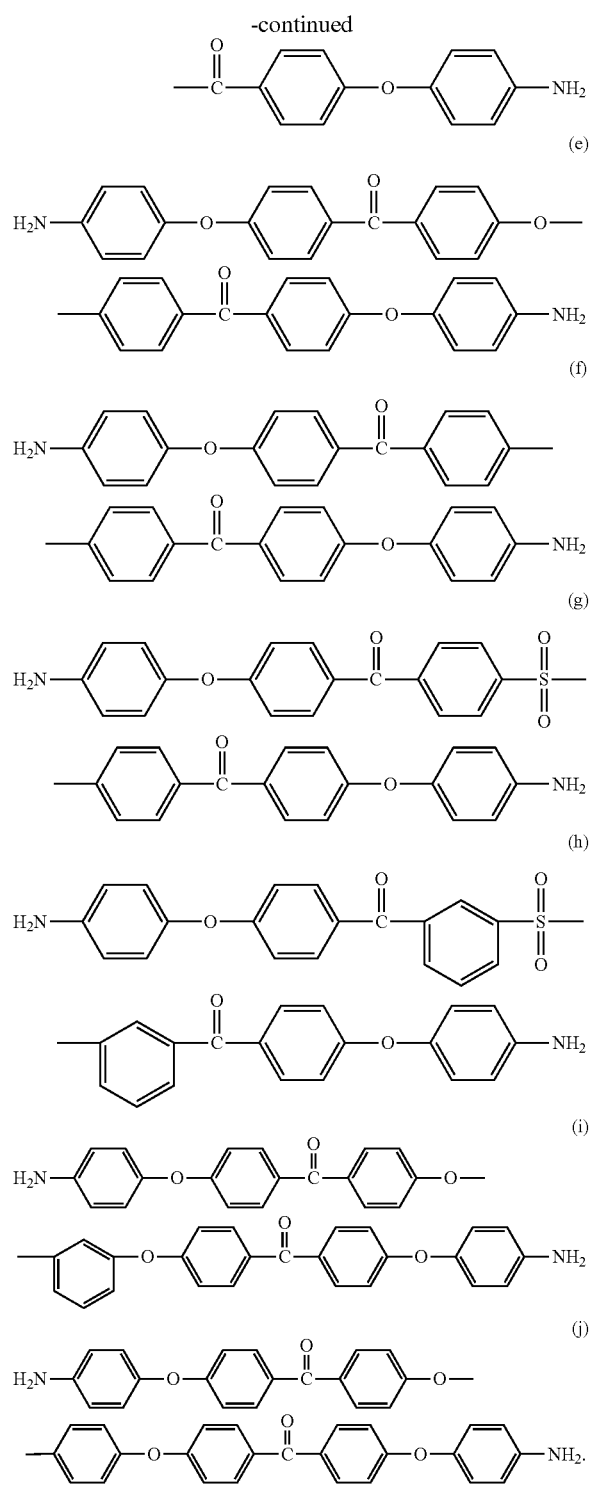

9. The method as claimed in claim 8, wherein the converting of the organic solvent soluble polyamic acid into the water soluble polyamic acid includes converting a carboxylic acid group of the organic solvent soluble polyamic acid into an amine salt or a metal salt.

10. The method as claimed in claim 9, wherein the converting of the carboxylic acid group into the amine salt or the metal salt includes:
preparing a polyamic acid powder from the polyamic acid dissolved in the organic solvent; and preparing a polyamic acid dissolved in water by dissolving the polyamic acid powder in a water solution including a water soluble amine compound, a metal hydroxide compound or a metal carbonate compound dissolved therein.

11. The method as claimed in claim 10, wherein:
the water solution in which the polyamic powder is dissolved includes the metal hydroxide compound dissolved therein, and
the metal hydroxide compound is represented by $M_x(OH)_y$, wherein M is selected from Li, Na, K, Mg, and Ca, $0<x\leq1$, and $0<y\leq2$.

12. The method as claimed in claim 10, wherein:
the water solution in which the polyamic powder is dissolved includes the metal carbonate compound dissolved therein, and
the metal carbonate compound is represented by $M_a(CO_3)_b$, wherein M is selected from Li, Na, K, Mg, and Ca, $0<a\leq2$, and $0<b\leq1$.

13. The method as claimed in claim 10, wherein:
the water solution in which the polyamic powder is dissolved includes the water soluble amine compound dissolved therein, and
the water soluble amine compound is vaporized in a vacuum drying process to be removed.

14. The method as claimed in claim 10, wherein:
the water solution in which the polyamic powder is dissolved includes the water soluble amine compound dissolved therein, and
the water soluble amine compound is at least one selected from the group of ammonium hydroxide, methylamine, dimethylamine, trimethylamine, ethylamine, diethylamine, triethylamine, propylamine, dipropylamine, butylamine, pentylamine, hexylamine, cyclohexylamine, monomethanolamine, dimethanolamine, trimethanolamine, monoethanolamine, diethanolamine, triethanolamine, ammonium hydroxide, tetramethylammonium hydroxide, and tetraethylammonium hydroxide.

15. The method as claimed in claim 9, wherein the converting of the carboxylic acid group into the amine salt or metal salt includes:
adding an organic solvent soluble amine compound, a metal hydroxide compound or a metal carbonate compound to the polyamic acid dissolved in the organic solvent and stirring such that the polyamic acid is converted into an amine salt or a metal salt; and
preparing a water soluble polyamic acid powder with the polyamic acid converted into the amine salt or the metal salt.

16. The method as claimed in claim 15, wherein:
the organic solvent soluble amine compound is added to the polyamic acid dissolved in the organic solvent, and
the organic solvent soluble amine compound includes at least one selected from the group of ammonium hydroxide, methylamine, dimethylamine, trimethylamine, ethylamine, diethylamine, triethylamine, propylamine, dipropylamine, butylamine, pentylamine, hexylamine, cyclohexylamine, monomethanolamine, dimethanolamine, trimethanolamine, monoethanolamine, diethanolamine, triethanolamine, ammonium hydroxide, tetramethylammonium hydroxide, tetraethylammonium hydroxide, tripentylamine, dibutylamine, dihexylamine, dicyclohexylamine, aniline, and pyridine.

17. The method as claimed in claim 8, wherein the acid dianhydride monomer includes at least one selected from the group of monomers (a) to (f) of Formula 2:

[Formula 2]

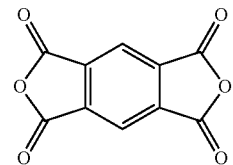

(a)

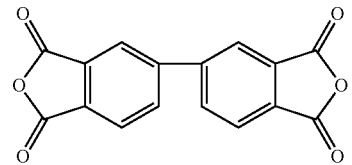

(b)

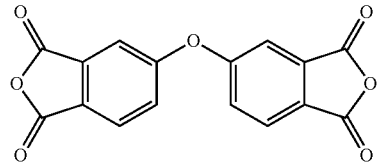

(c)

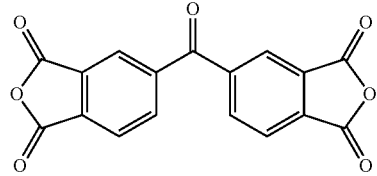

(d)

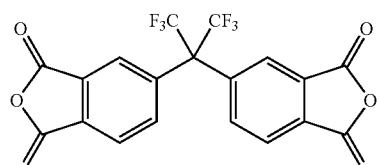

(e)

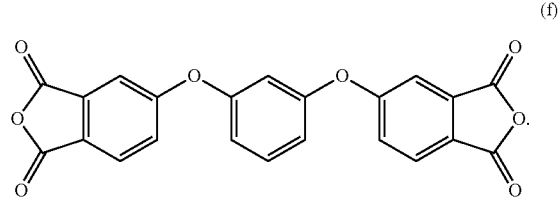

(f)

18. The method as claimed in claim 8, wherein the organic solvent includes at least one selected from the group of meta-cresol, N-methyl-2-pyrrolidone (NMP), dimethylformamide (DMF), dimethylacetamide (DMAc), gamma-butyrolactone, 2-butoxyethanol, and 2-ethoxyethanol.

19. A lithium rechargeable battery comprising a negative electrode, a positive electrode, a separator, and a lithium salt-containing nonaqueous electrolyte, wherein at least one of the negative electrode and the positive electrode includes an electrode current collector, electrode active material, and a binder, and the binder is a polyimide-containing binder obtained by drying the binder composition of claim 1.

20. The lithium rechargeable battery as claimed in claim 19, wherein an equivalent of an imide group in the binder exceeds about 300 g/eq.

21. The water soluble binder composition as claimed in claim 1, wherein the conductive agent includes at least one of natural graphite, artificial graphite, carbon nanofibers, carbon black, acetylene black, ketjen black, copper, nickel, aluminum, and silver metal powder.

\* \* \* \* \*